United States Patent
Qian (10) Patent No.: US 8,042,986 B2
(45) Date of Patent: Oct. 25, 2011

(54) BACKLIGHT MODULE

(75) Inventor: James Qian, JiangSu Pro (CN)

(73) Assignee: Wintek Corporation, Tepz Tantzu, Taichung (TW)

( * ) Notice: Subject to any disclaimer, the term of this patent is extended or adjusted under 35 U.S.C. 154(b) by 370 days.

(21) Appl. No.: 12/429,258

(22) Filed: Apr. 24, 2009

(65) Prior Publication Data

US 2009/0268485 A1 Oct. 29, 2009

(30) Foreign Application Priority Data

Apr. 29, 2008 (TW) .............................. 97207399 U (51) Int. Cl.
*F21V 7/04* (2006.01)
*F21V 21/00* (2006.01)
*F21V 3/00* (2006.01)
*F21V 5/00* (2006.01)
*F21S 4/00* (2006.01)
*G02F 1/1345* (2006.01)

(52) U.S. Cl. .................. 362/634; 362/633; 362/249.11; 362/311.02; 349/150

(58) Field of Classification Search .......... 362/632–634, 362/249.11, 311.02
See application file for complete search history.

(56) References Cited

U.S. PATENT DOCUMENTS

| | | | |
|---|---|---|---|
| 7,270,462 B2 * | 9/2007 | Yu et al. | 362/609 |
| 2006/0077693 A1 * | 4/2006 | Ko et al. | 362/633 |
| 2008/0037285 A1 * | 2/2008 | Eda | 362/631 |
| 2008/0055517 A1 * | 3/2008 | Yu | 349/65 |
| 2008/0106670 A1 * | 5/2008 | Chang et al. | 349/58 |
| 2008/0130313 A1 * | 6/2008 | Kim | 362/611 |
| 2009/0322983 A1 * | 12/2009 | Hashino | 349/61 |

* cited by examiner

*Primary Examiner* — Jong-Suk (James) Lee
*Assistant Examiner* — David Makiya
(74) *Attorney, Agent, or Firm* — Thomas|Kayden (57) ABSTRACT

A backlight module including several light sources, a frame, a light guide plate and a flexible printed circuit board is provided. The flexible printed circuit board includes a body and a fixing structure. The body is bent, so that a first part and a second part of the body are respectively disposed on two sides of the frame. The light sources are disposed on the first part, and the light-emitting surfaces of the light sources face the light guide plate. The fixing structure including a structure body, several first connecting portions and two protrusions is disposed on the first part. The first connecting portions extend from the two opposite first sides and are fixed on the body, so that the structure body is positioned above the light sources. The protrusions respectively extend slantwise from the first sides toward the direction opposite to the structure body and insert into the frame.

12 Claims, 8 Drawing Sheets

BACKLIGHT MODULE

This application claims the benefit of Taiwan application Serial No. 97207399, filed Apr. 29, 2008, the subject matter of which is incorporated herein by reference.

BACKGROUND OF THE INVENTION

1. Field of the Invention

The invention relates in general to a backlight module, and more particularly to a backlight module having a fixing structure.

2. Description of the Related Art

Figure 1A:
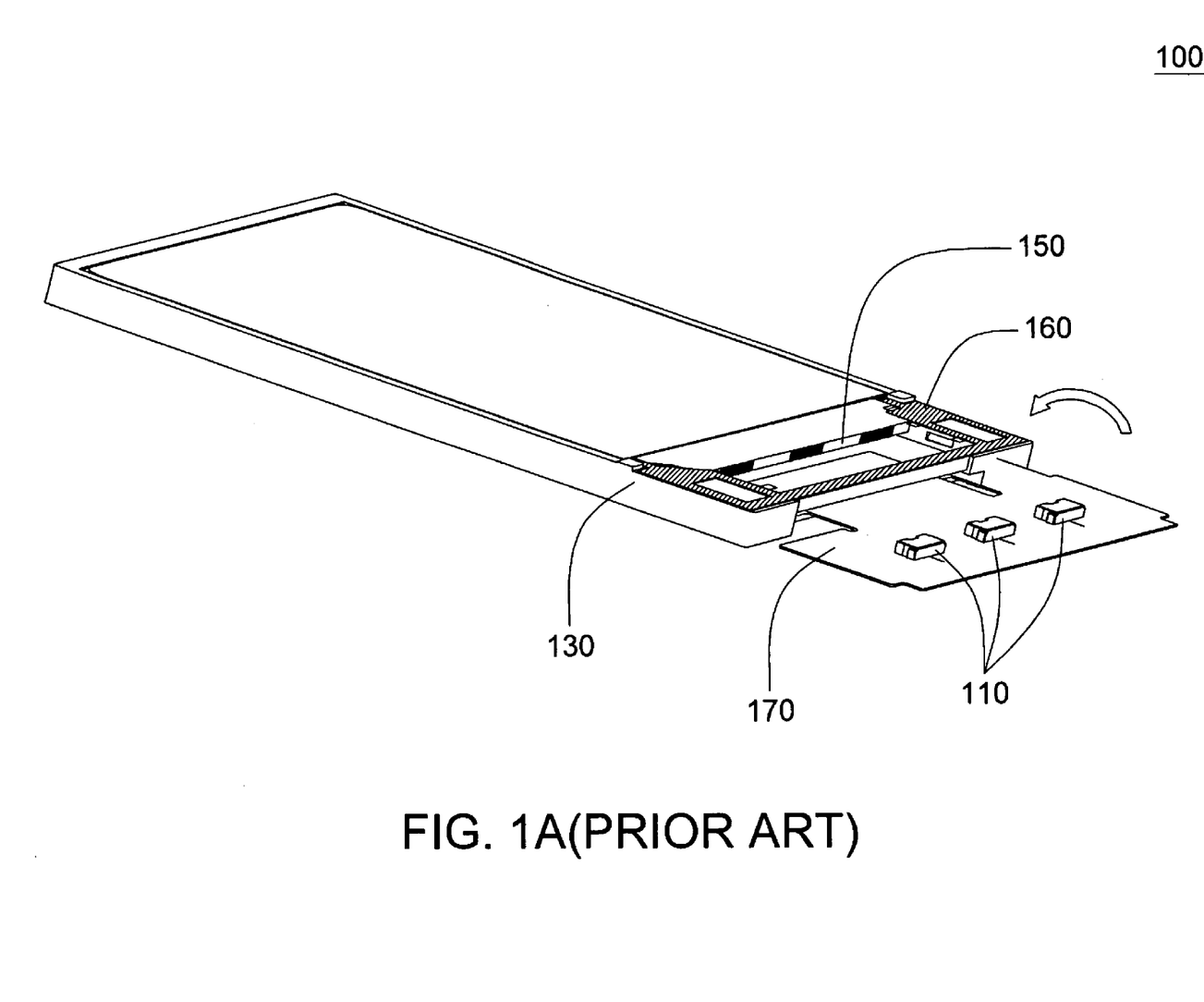
FIG. 1A (Prior Art) shows a flexible printed circuit board of a conventional backlight module disposed at a frame.

Referring to FIG. 1A, a flexible printed circuit board of a conventional backlight module disposed at a frame is shown. The backlight module 100 includes several light sources 110, a frame 130, a light guide plate 150 and a flexible printed circuit board 170. The light guide plate 150 is disposed in the frame 130, and the light sources 110 are disposed on the flexible printed circuit board 170. The flexible printed circuit board 170 is bent to be disposed on two sides of the frame 130.

Figure 1B:
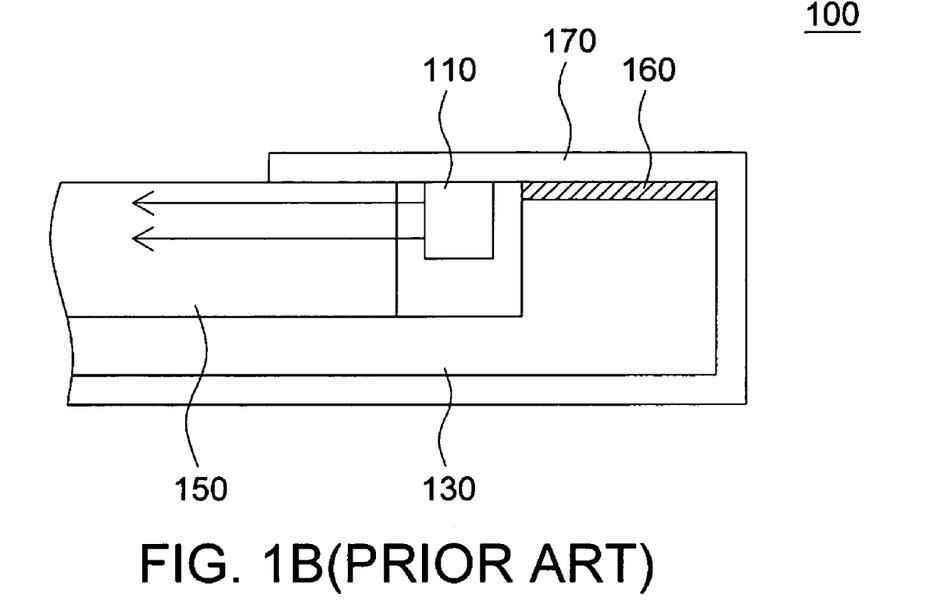
FIG. 1B (Prior Art) shows a cross-sectional view of the flexible printed circuit board in FIG. 1A bent and disposed on the two sides of the frame.

Referring to FIG. 1B, a cross-sectional view of the flexible printed circuit board in FIG. 1A bent and disposed on the two sides of the frame is shown. A two-sided tape 160 is disposed between the flexible printed circuit board 170 and the frame 130 so as to fix the bent flexible printed circuit board 170 on the frame 130. Therefore, the flexible printed circuit board 170 is fixed on the frame 130, and the light sources 110 are positioned at a side of the light guide plate to radiate light into the light guide plate 150. However, as indicated in FIG. 1A and FIG. 1B, the frame 130 has only a limited area on which the two-sided tape 160 (denoted by sloped lines) can be disposed. As the two-sided tape 160 can not provide enough adhesiveness, the flexible printed circuit board 170 may easily rise up due to its bounceback. Moreover, although the flexible printed circuit board 170 with a high level of hardness may reduce the possibility of the bounceback, it is not easy to bend the flexible printed circuit board 170 into the shape shown in FIG. 1B.

Figure 1C:
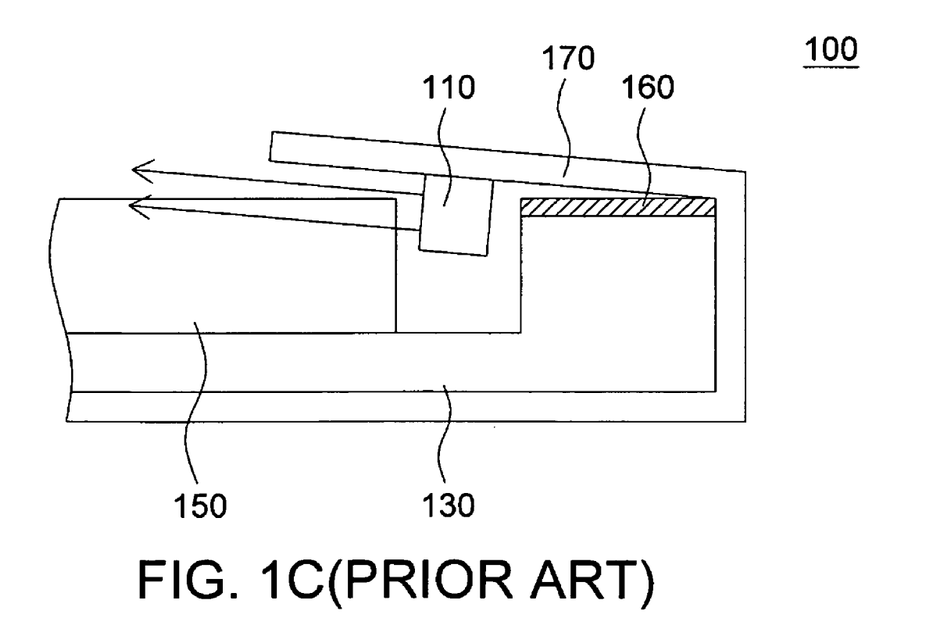
FIG. 1C (Prior Art) shows the flexible printed circuit board in FIG. 1B rising up due to the bend.

Referring to FIG. 1C, the flexible printed circuit board in FIG. 1B rising up due to the bend is shown. When the flexible printed circuit board 170 rises up, the light sources 110 disposed on the flexible printed circuit board 170 can not precisely radiate the light into the light guide plate 150. Thus, the light is likely to gather at a part of a display panel (not illustrated) near the light sources 110, so that the light emitting efficiency and uniformity of the backlight module 100 are decreased. Therefore, how to reduce the occurrence of the bouceback of the bent flexible printed circuit board so as to avoid the light emitting efficiency and uniformity of the backlight module being affected has become an imminent issue to be resolved.

SUMMARY OF THE INVENTION

The invention is directed to a backlight module. A fixing structure of a flexible printed circuit board is used in a frame of the backlight module, so that the flexible printed circuit board is firmly disposed on the frame. As the occurrence of the bounceback of the bent flexible printed circuit can be effectively reduced, light sources disposed on the flexible printed circuit board can precisely radiate light into a light guide plate of the backlight module. Thus, the backlight module of the invention has excellent light emitting efficiency and uniformity.

According to the present invention, a backlight module including several light sources, a frame, a light guide plate and a flexible printed circuit board is provided. The light guide plate is disposed in the frame. The flexible printed circuit board includes a body and a fixing structure. A part of the body is bent, so that a first part and a second part of the body are respectively disposed on a top side and a bottom side of the frame. The light sources are disposed on the first part, and the light-emitting surfaces of the light sources face the light guide plate. The fixing structure is disposed on the first part and includes a structure body, several first connecting portions and two protrusions. The structure body has two first sides which are opposite to each other. The first connecting portions extend from the first sides and are fixed on the body, so that the structure body is positioned above the light sources. The protrusions respectively extend slantwise from the first sides toward the direction opposite to the structure body and insert into the frame.

The invention will become apparent from the following detailed description of the preferred but non-limiting embodiments. The following description is made with reference to the accompanying drawings.

DETAILED DESCRIPTION OF THE INVENTION

Figure 2A:
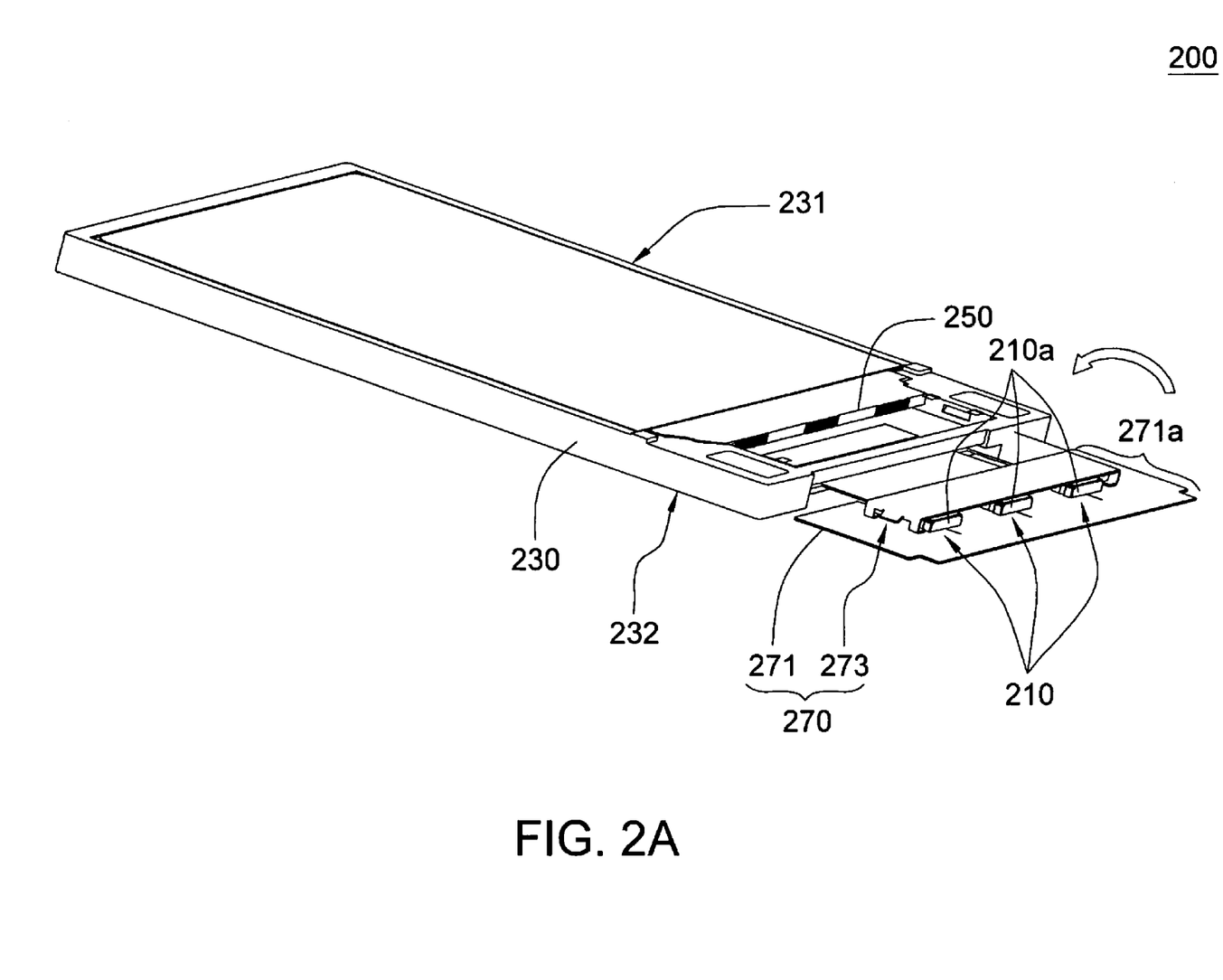
FIG. 2A shows a backlight module according to a preferred embodiment of the invention.
Figure 2B:
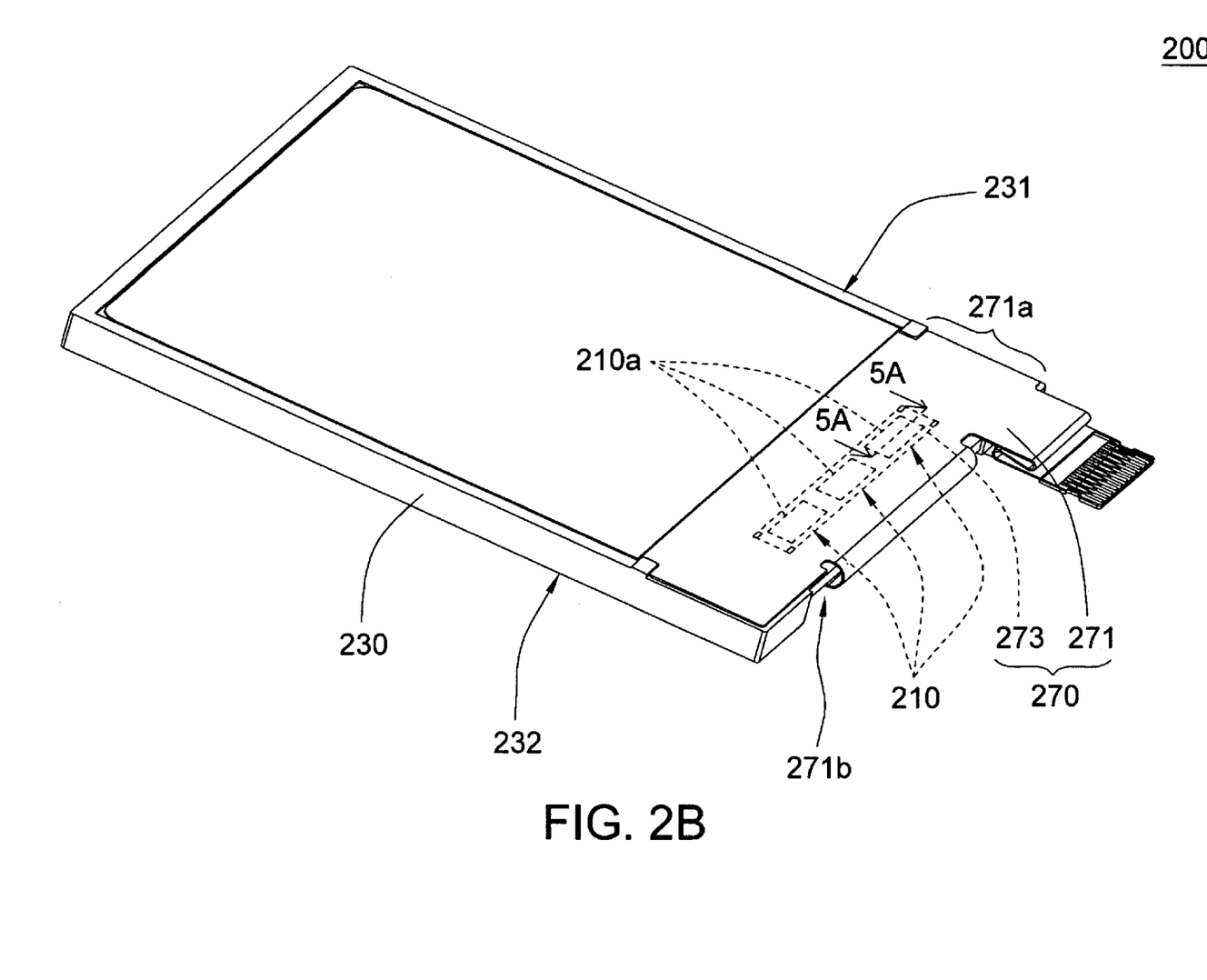
FIG. 2B shows the body in FIG. 2A bent to be disposed on a top side and a bottom side of the frame.

Referring to FIG. 2A and FIG. 2B at the same time, a backlight module according to a preferred embodiment of the invention is shown in FIG. 2A, and the body in FIG. 2A bent to be disposed on a top side and a bottom side of the frame is shown in FIG. 2B. The backlight module 200 includes several light sources 210, a frame 230, a light guide plate 250 and a flexible printed circuit board 270.

The light guide plate 250 is disposed in the frame 230. The flexible printed circuit board 270 includes a body 271 and a fixing structure 273. A part of the body 271 is bent, so that a first part 271a and a second part 271b of the body 271 are respectively disposed on a top side 231 and a bottom side 232 of the frame 230. The light sources 210 are disposed on the first part 271a of the body 271 and the light-emitting surfaces 210a of the light sources 210 face the light guide plate 250. The fixing structure 273 is disposed on the first part 271a of the body 271.

Figure 3A:
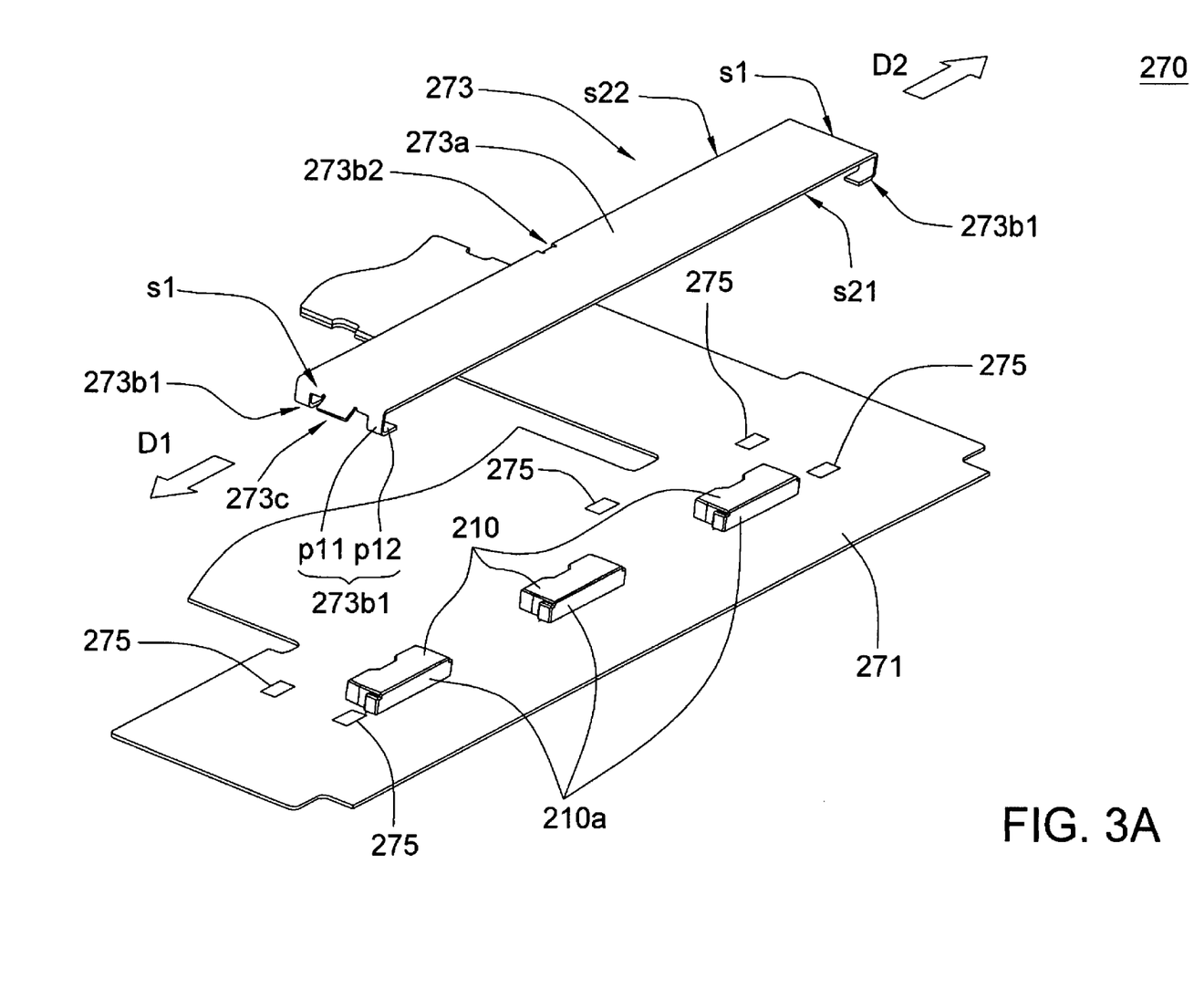
FIG. 3A shows the flexible printed circuit board in FIG. 2A.

Referring to FIG. 3A, the flexible printed circuit board in FIG. 2A is shown. The fixing structure 273 includes, for example, a structure body 273a, four first connecting portions 273b1 and two protrusions 273c. The first connecting portions 273b1 are, for example, respectively positioned at the four corners of the structure body 273a, and each protrusion 273c is positioned between the two first connecting portions 273b1. Despite the present embodiment of the invention is exemplified by the four first connecting portions 273b1 and the two protrusions 273c shown in FIG. 3A, the number and position of the first connecting portions 273b1 and the protrusions 273c are not limited thereto. Anyone who is skilled in the related art will understand that the number and position of the first connecting portions 273b1 and the protrusions 273c can be adjusted according to actual requirement.

The structure body 273a has two first sides s1. The first sides s1 are opposite to each other. The first connecting portions 273b1 extend from the first sides s1 and are fixed on the body 271, so that the structure body 273a is positioned above the light sources 210. The two protrusions 273c respectively extend slantwise from the first sides s1 toward the direction opposite to the structure body 273a (that is, the direction D1 and direction D2 as indicated in FIG. 3A). As the two protrusions 273c are inserted into the frame 230, the flexible printed circuit board 270 is firmly fixed on the frame 230.

Compared with using a two-sided tape to fix a flexible printed circuit board, the flexible printed circuit board 270 can be more firmly disposed on the frame 230 by using the fixing structure 273. Therefore, the possibility that the body 271 of the flexible printed circuit board 270 comes off the frame 230 can be reduced. As the light generated by the light sources 210 disposed on the body 271 of the flexible printed circuit board 270 is precisely radiated into the light guide plate 250 (as indicated in FIG. 2A), the backlight module 200 has excellent light emitting efficiency and uniformity.

Figure 3B:
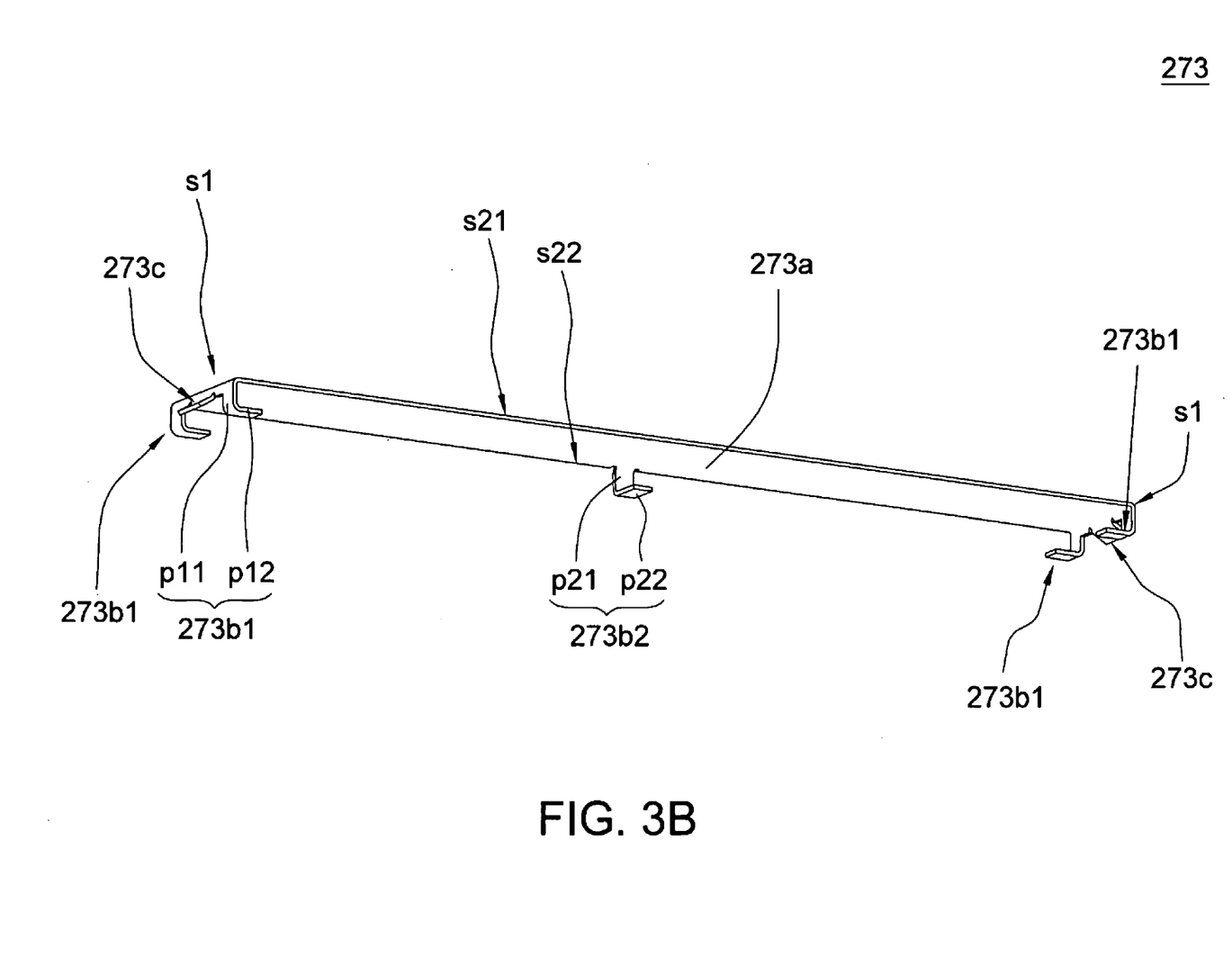
FIG. 3B shows the fixing structure in FIG. 3A.

The backlight module 200 of the present embodiment of the invention is further elaborated below. Referring to FIG. 3A and FIG. 3B at the same time, the fixing structure in FIG. 3A is shown in FIG. 3B. The fixing structure 273 can further include at least one second connecting portion 273b2 positioned at one of the second sides s21 and s22 of the structure body 273a. The second side s21 and the second side s22 are opposite to each other, and each of the second sides s21 and s22 is perpendicular to each first side s1. Preferably, the second connecting portion 273b2 extends from the second side s22 and is fixed on the body 273a, so that the light radiated from the light sources 210 into the light guide plate 250 is not blocked. Thus, the second connecting portion 273b2 disposed on the body 271 makes the flexible printed circuit board 270 firmly disposed on the frame 230 of the backlight module 200 (as indicated in FIG. 2A). In addition, the second connecting portion 273b2 provides additional support to the structure body 273a.

As indicated in FIG. 3A and FIG. 3B, the first connecting portions 273b1 and the second connecting portion 273b2 have the same structures, therefore only the structure of one of the first connecting portions 273b1 is elaborated. The shape of the first connecting portion 273b1 is approximately an L-shaped, and the first connecting portion 273b1 has a first side plate p11 and a second side plate p12. One end of the first side plate p11 is connected to the structure body 273a, and the other end of the first side plate p11 is connected to one end of the second side plate p12. The flexible printed circuit board 270 includes several solder pads 275 (as indicated in FIG. 3A) disposed on the first part 271a of the body 271, so that the second side plate p12 can be disposed on solder pad 275 by surface mounting technology (SMT).

In the present embodiment of the invention, the second connecting portion 273b2 and the first connecting portion 273b1 have the same structure, so the second connecting portion 273b2 also has a first side plate p21 and a second side plate p22 which are connected to each other. The second side plate p22 of the second connecting portion 273b2 is disposed on the solder pad 275 by surface mounting technology. Thus, the fixing structure 273 is fixed on the body 271 for fixing the flexible printed circuit board 270 onto the frame 230 (as indicated in FIG. 2B). The number, the shape and the position of the first connecting portions 273b1 and the second connecting portion 273b2 disclosed above are for exemplification only, and the invention is not limited thereto. Anyone who is skilled in the related art will understand that the number, the shape and the position of the first connecting portions 273b1 and the second connecting portion 273b2 can be adjusted according to actual requirement.

Figure 4:
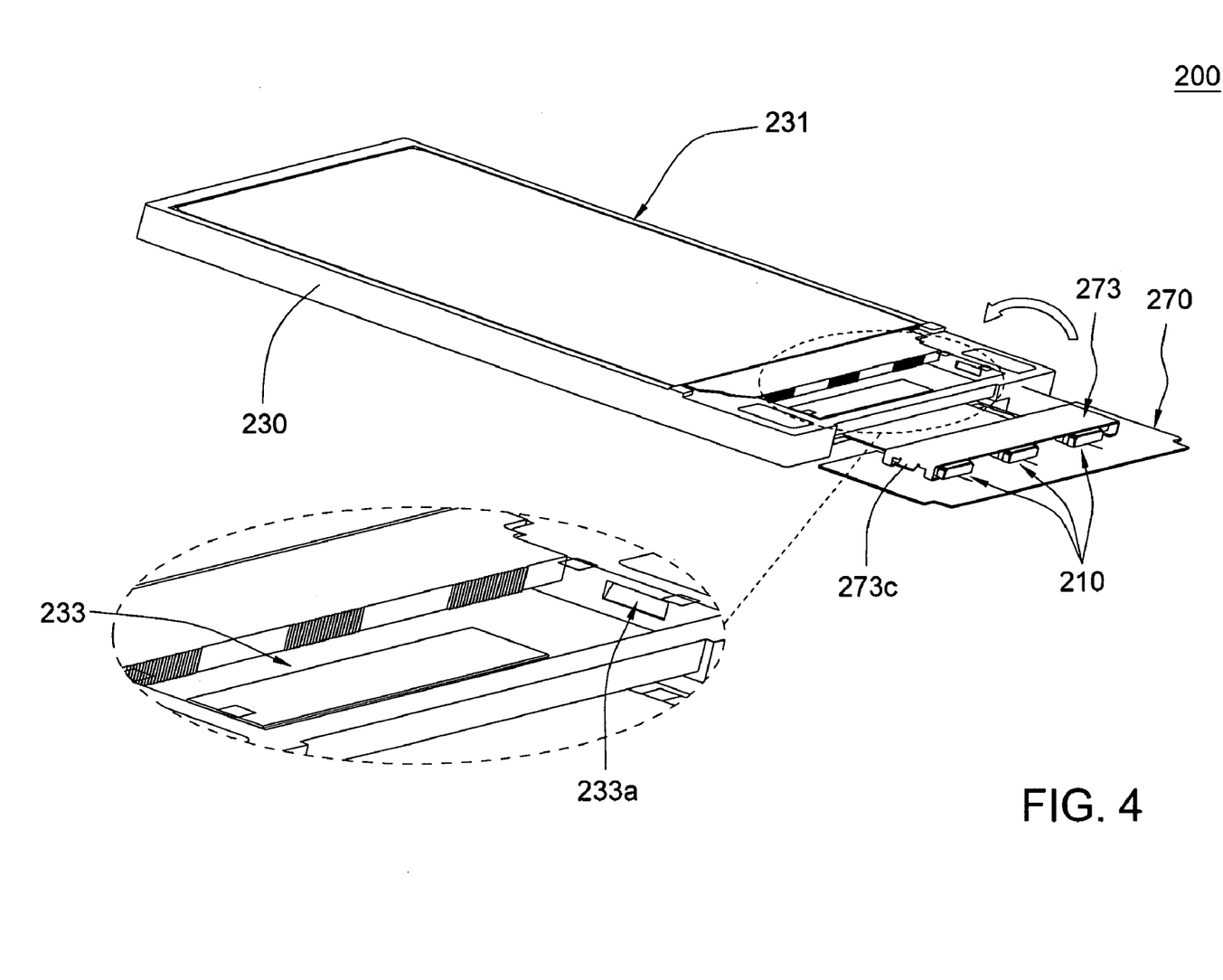
FIG. 4 shows a partial enlarged illustration of the backlight module in FIG. 2A.
Figure 5A:
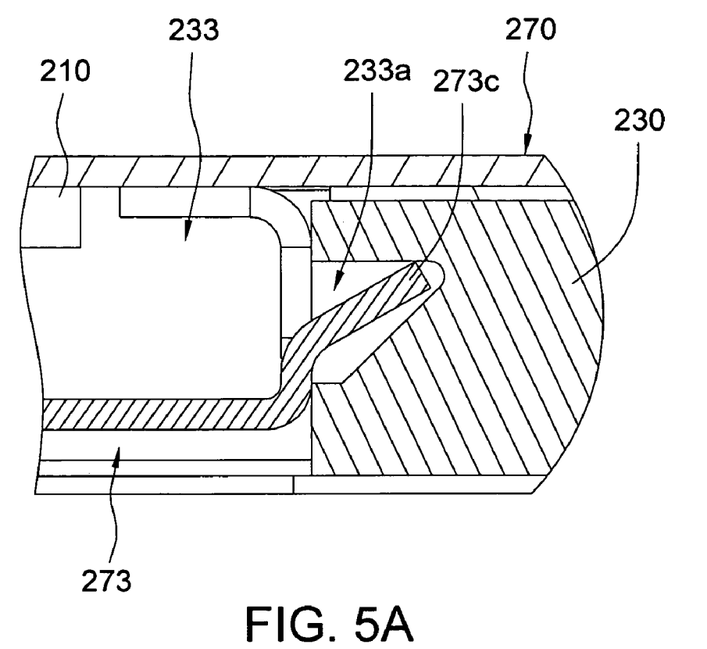
FIG. 5A shows a cross-sectional view along the cross-sectional line 5A-5A in FIG. 2B.

Referring to FIG. 4, a partial enlarged illustration of the backlight module in FIG. 2A is shown. The top side 231 of the frame 230 has a recess 233, and each of the two opposite inner walls of the recess 233 has a hole 233a. Referring to FIG.4 and FIG. 5A at the same time, a cross-sectional view along the cross-sectional line 5A-5A in FIG. 2B is shown in FIG. 5A. The recess 233 receives one light source 210 and the fixing structure 273, and the hole 233a receives a protrusion 273c. Thus, the light source 210 and the fixing structure 273 are received in the recess 233, and the protrusion 273c inserts into the frame 230 so as to fix the flexible printed circuit board 270 onto the frame 230.

Figure 5B:
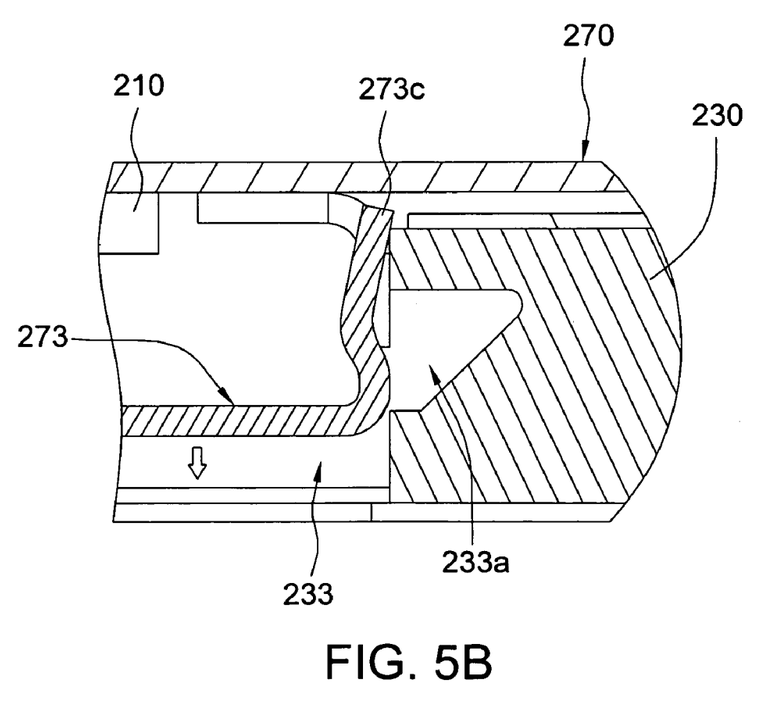
FIG. 5B shows a cross-sectional view of the protrusion of the fixing structure in FIG. 5A during the assembly.

The protrusion 273c is a protrudent structure. Thus, during the process of bending and assembling the flexible printed circuit board 270 onto the frame 230, the protrusion 273c will contact the inner wall of the frame 230. Referring to FIG. 5B, a cross-sectional view of the protrusion of the fixing structure in FIG. 5A during the assembly is shown. When the light source 210 and the fixing structure 273 are to be assembled into the recess 233, the protrusion 273c is pushed by the inner wall of the frame 230. As the protrusion 273c is made of a flexible material, the protrusion 273c is slightly bent when being pushed by the inner wall of the frame 230. When the protrusion 273c is received in the hole 233a as indicated in FIG. 5A, the protrusion 273c restores to its original shape as a result of its material property and inserts into the frame 230.

According to the backlight module disclosed in the above embodiment of the invention, the protrusions of the fixing structure are inserted into the holes of the frame of the backlight module, so that the bent flexible printed circuit board is firmly disposed on the frame. As the occurrence of the bounceback of the bent flexible printed circuit board is effectively reduced, the light sources disposed on the flexible printed circuit board can precisely radiate the light into the light guide plate of the backlight module. Thus, the backlight module has excellent light emitting efficiency and uniformity.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
a plurality of light sources;
a frame;
a light guide plate disposed in the frame; and
a flexible printed circuit board, comprising:
a body, wherein a part of the body is bent, so that a first part and a second part of the body are respectively disposed on a top side and a bottom side of the frame, the light sources are disposed on the first part of the body, and the light-emitting surfaces of the light sources face the light guide plate; and a fixing structure disposed on the first part of the body, wherein the fixing structure comprises:
- a structure body having two first sides, wherein the two first sides are opposite to each other;
- a plurality of first connecting portions, wherein the first connecting portions extend from the first sides and are fixed on the body, so that the structure body is positioned above the light sources; and
- two protrusions respectively extending slantwise from the first sides toward the direction opposite to the structure body and inserting into the frame.

2. The backlight module according to claim 1, wherein the structure body further has two second sides opposite to each other, each second side is substantially perpendicular to each first side, and the fixing structure further comprises:
- at least one second connecting portion extending from one of the second sides and fixed on the body.

3. The backlight module according to claim 2, wherein the shape of the second connecting portion is approximately an L shape, the second connecting portion has a first side plate and a second side plate, one end of the first side plate is connected to the structure body, the other end of the first side plate is connected to one end of the second side plate, and the second side plate is disposed on the body.

4. The backlight module according to claim 2, wherein the second connecting portion is disposed on the body by surface mounting technology.

5. The backlight module according to claim 2, wherein the flexible printed circuit board further comprises:
- at least one solder pad disposed on the first part of the body, wherein the second connecting portion is disposed on the solder pad.

6. The backlight module according to claim 1, wherein the fixing structure comprises four first connecting portions and two protrusions, the first connecting portions are respectively positioned at the four corners of the structure body, and each protrusion is positioned between two of the first connecting portions.

7. The backlight module according to claim 1, wherein the shape of each first connecting portion is approximately an L shape, each of the first connecting portions has a first side plate and a second side plate, one end of the first side plate is connected to the structure body, the other end of the first side plate is connected to one end of the second side plate, and the second side plate is disposed on the body.

8. The backlight module according to claim 1, wherein the first connecting portions are disposed on the body by surface mounting technology.

9. The backlight module according to claim 1, wherein the flexible printed circuit board further comprises:
- a plurality of solder pads disposed on the first part of the body, wherein the first connecting portions are respectively fixed on the solder pads.

10. The backlight module according to claim 1, wherein the material of the protrusions comprises a flexible material.

11. The backlight module according to claim 1, wherein the top side of the frame has a recess receiving the light sources and the fixing structure.

12. The backlight module according to claim 11, wherein each of the two opposite inner walls of the recess has a hole receiving each of the protrusions.

* * * * *